(12) United States Patent
Jendoubi et al.

(10) Patent No.: US 9,097,018 B2
(45) Date of Patent: Aug. 4, 2015

(54) PVC MEMBRANE HAVING REDUCED PLASTICIZER MIGRATION

(75) Inventors: Elyes Jendoubi, Zürich (CH); Norman Blank, Rueschlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 8 days.

(21) Appl. No.: 13/882,916

(22) PCT Filed: Dec. 14, 2011

(86) PCT No.: PCT/EP2011/072796
§ 371 (c)(1),
(2), (4) Date: May 1, 2013

(87) PCT Pub. No.: WO2012/080355
PCT Pub. Date: Jun. 21, 2012

(65) Prior Publication Data
US 2013/0216839 A1    Aug. 22, 2013

(30) Foreign Application Priority Data

Dec. 17, 2010   (EP) ..................... 10195776

(51) Int. Cl.
*B05D 3/02* (2006.01)
*B05D 1/38* (2006.01)
(Continued)

(52) U.S. Cl.
CPC . *E04D 5/10* (2013.01); *B32B 27/08* (2013.01); *B32B 27/30* (2013.01); *B32B 27/34* (2013.01); *B32B 27/40* (2013.01)

(58) Field of Classification Search
CPC ............ B32B 27/38; B32B 27/40; C08J 5/18; C08J 7/08; C08J 7/042; C08J 7/047; C08J 2367/02; C08J 2475/04; C08J 2483/04
USPC ................ 427/379, 385.5, 393.5, 402, 407.1; 428/423.5, 424.6; 52/408
See application file for complete search history.

(56) References Cited

U.S. PATENT DOCUMENTS

| | | | |
|---|---|---|---|
| 4,045,600 A | | 8/1977 | Williams |
| 4,398,642 A | * | 8/1983 | Okudaira et al. ............ 428/35.7 |

(Continued)

FOREIGN PATENT DOCUMENTS

| | | |
|---|---|---|
| DE | 195 21 500 A1 | 6/1996 |
| DE | 100 00 656 A1 | 7/2001 |

(Continued)

OTHER PUBLICATIONS

Jun. 18, 2013 International Preliminary Report on Patentability issued in International Application No. PCT/EP2011/072796.

(Continued)

*Primary Examiner* — Thao T Tran
(74) *Attorney, Agent, or Firm* — Oliff PLC (57) ABSTRACT

The invention relates to a membrane including a partition layer, wherein the partition layer contains at least 50 wt % of PVC, and a barrier layer. The barrier layer can be a barrier layer, wherein the barrier layer has a polyamide layer containing more than 50 wt % of copolymer, wherein said polyamide layer is connected to the partition layer by a polyurethane layer, wherein the polyurethane layer contains more than 10 wt % of polyurethane. Alternatively, the barrier layer can be a barrier layer, wherein the barrier layer is made of a composition containing 5-50 wt % of polyurethane and 50-95 wt % of copolymer. The membranes according to the invention have significantly lower plasticizer migration compared to the membranes of the prior art and are characterized by improved aging resistance, in particular with regard to the adhesion of the barrier layer to the partition layer, and impermeability to moisture.

7 Claims, 3 Drawing Sheets

(51) Int. Cl.
  *E04D 7/00* (2006.01)
  *E04D 5/10* (2006.01)
  *B32B 27/08* (2006.01)
  *B32B 27/30* (2006.01)
  *B32B 27/34* (2006.01)
  *B32B 27/40* (2006.01)

(56) References Cited

U.S. PATENT DOCUMENTS

2005/0089656 A1* 4/2005 Shiina ............... 428/34.2
2007/0224414 A1   9/2007 Leonard et al.
2009/0017310 A1* 1/2009 Demmig et al. ........ 428/423.1

FOREIGN PATENT DOCUMENTS

| | | |
|---|---|---|
| EP | 0 293 030 A1 | 11/1988 |
| EP | 1 443 158 A1 | 8/2004 |
| WO | WO 97/18275 A1 | 5/1997 |
| WO | WO 00/43608 A1 | 7/2000 |
| WO | WO 01/34559 A1 | 5/2001 |
| WO | WO 2009/026194 A1 | 2/2009 |

OTHER PUBLICATIONS

Feb. 27, 2012 International Search Report issued in International Application No. PCT/EP2011/072796 (with translation).
Aug. 28, 2014 Office Action issued in Chinese Application No. 201180058493.9 (with English Translation).

* cited by examiner

PVC MEMBRANE HAVING REDUCED PLASTICIZER MIGRATION

TECHNICAL FIELD

The invention relates to the field of sealing in the civil construction sector, in particular roof covering.

PRIOR ART

PVC as a component of flexible sheeting for waterproofing plays an important part for sealing in the civil construction field, in particular for roof covering. Plasticizers have been used for a long time to control the processability of PVC. These plasticizers have the big disadvantage, however, that they migrate. Which means that the plasticizers over time migrate towards the surface, on the one hand, were they produce stickiness of the surface, or they migrate into the carrier that joins them to a substrate. Experience has shown that migration is even reinforced by high temperatures, such as those caused by exposure to sunlight, for example. The migration moreover causes plasticizer depletion of the PVC layer, which reduces its elasticity significantly over time, so that the layers become brittle, which produces cracks sooner or later. The migration of the plasticizer thus results in that the properties which are important for a PVC layer, that is the sealing against moisture, flexibility and aging stability, are lost.

REPRESENTATION OF THE INVENTION

It is therefore an objective of the present invention to provide sealing membranes which do not have the above-mentioned disadvantages. Surprisingly it was found that a membrane pursuant to Claim 1 solves this problem.

The core of the invention is therefore a membrane 1, comprising a sealing layer 2, wherein the sealing layer consists more than 50% by weight of PVC, relative to the total weight of the sealing layer, and a barrier layer 3. The barrier layer 3 can either be a barrier layer S1 31 or a barrier layer S2 32.

In case of a barrier layer S1 31, this involves a barrier layer which has a polyamide layer 4 which has more than 50% by weight of copolymer PA, relative to the total weight of the polyamide layer 4, which is connected with the sealing layer 2 by a polyurethane layer 5, wherein the polyurethane layer 5 contains more than 10% by weight of polyurethane PUR, relative to the total weight of the polyurethane layer 5.

In the case of a barrier layer S2 32, this is a barrier layer consisting of a composition comprising 5-50% by weight of polyurethane PUR and 50-95% by weight of copolymer PA.

The polyurethane PUR contains at least one nucleophilic functional group, which is selected from the group consisting of hydroxyl group, carboxyl group, sulfonate group and phosphate group. The copolymer PA is a copolymer of aliphatic diamine with 4-10 C atoms, dicarboxylic acid with 4-10 C atoms, cycloaliphatic diamine with 6-20 C atoms, and a compound selected from the group consisting of aliphatic lactam with 4-10 C atoms and alpha, omega-amino carboxylic acids with 2-20 C atoms.

The membranes according to the invention comprise a significantly deeper plasticizer migration compared to the membranes from the prior art and distinguish themselves by an improved aging stability, particularly relative to the adhesion of the barrier layer 3 on the sealing layer 2, and impermeability against moisture.

Further aspects of the invention are among other things methods for producing the previously mentioned membranes and are the subject of further independent claims. Particularly preferred embodiments of the invention are the subject of the dependent claims.

BRIEF DESCRIPTION OF THE DRAWINGS

The invention is described more detailed in the following with reference to the figures below, wherein it is pointed out that only the elements are shown which are significant for understanding the invention clearly. Identical elements in the different figures are marked with the same reference symbols. It is pointed out moreover that the FIGS. 1 and 2 that are shown here are merely schematic representations without references to dimensions.

MEANS OF IMPLEMENTING THE INVENTION

The present invention relates to a membrane 1 comprising a sealing layer 2, wherein the sealing layer consists of PVC more than 50% by weight relative to the total weight of the sealing layer, as well as a barrier layer 3.

The sealing layer 2 consists more than 50% by weight of PVC relative to the total weight of the sealing layer. The sealing layer consists preferably more than 70% by weight of PVC relative to the total weight of the sealing layer.

To be optionally suited as a sealing layer, such layer should be waterproof, if possible, and even if subjected to water or moisture for extended periods should not decompose or be damaged mechanically. Films that are particularly suited as a sealing layer are those which are already in use for sealing applications in structural and civil engineering in the prior art. The sealing layer should advantageously have at least a low degree of elasticity to be able to bridge differences in expansion between the sealing membrane and the substrate caused by temperature, for example, or stresses caused by cracks in the substrate, without damaging the sealing layer or causing it to tear and which would impair the sealing function of the sealing layer.

The sealing layer 2 can furthermore contain materials which are suitable as processing aids for PVC. Such materials are typically selected from the group consisting of polyethylene with high density (HDPE), polyethylene with medium density (MDPE), polyethylene with low density (LDPE), polyethylene (PE), polypropylene (PP), polyethylene terephthalate (PET), polystyrene (PS), ethylene vinyl acetate (EVA), chloro-sulfonated polyethylene, thermoplastic polyolefins (TPO), ethylene propylene diene monomer (EPDM) and polyisobutylene (PIB) as well as mixtures thereof. The sealing layer 2 will preferably consist less than 5% by weight, preferably less than 1% by weight, particularly preferably less than 0.5% by weight of the above-mentioned materials which are suitable processing aids for PVC, relative to the total weight of the sealing layer.

The sealing layer preferably has a percentage of plasticizer between 20-45% by weight, particularly preferably 30-40% by weight, relative to the total weight of the sealing layer.

The plasticizers used are typically esters of organic carboxylic acids or their anhydrides, such as phthalates, for example dioctyl phthalate, diisononyl phthalate, adipates, for example dioctyl adipate, azelates and sebacates, polyols, for example polyoxyalkylene polyols and polyester polyols, organic phosphoric acid esters and sulfonic acid esters or polybutenes.

The sealing layer preferably has a layer thickness in the millimeter range, typically between 0.2 and 15 mm, preferably between 0.5 and 4 mm.

The barrier layer 3 can either be a barrier layer S1 31 or a barrier layer S2 32.

Figure 1:
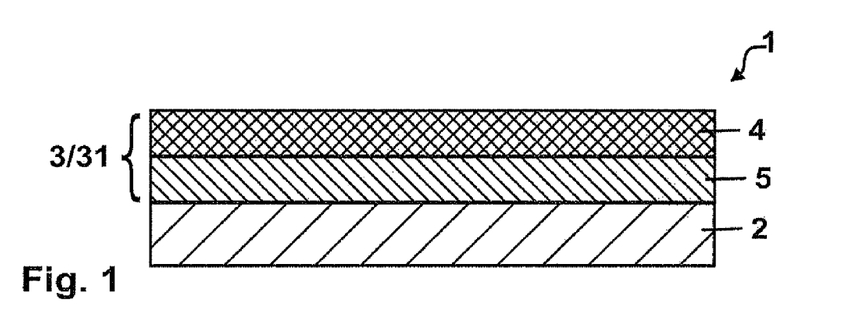
FIG. 1 shows a cross-section through a membrane according to the invention.

FIG. 1 illustrates a cross-section through a potential membrane according to the invention, which has a barrier layer S1 31.

The barrier layer S1 31, has a polyamide layer 4, comprising more than 50% by weight of copolymer PA, relative to the total weight of the polyamide layer 4, which is connected with the sealing layer 2 by a polyurethane layer 5, wherein the polyurethane layer 5 consists more than 10% by weight of polyurethane PUR, relative to the total weight of the polyurethane layer 5.

The polyamide layer 4 comprises more than 50% by weight of copolymer PA, relative to the total weight of the polyamide layer 4.

The copolymer PA is a copolymer of aliphatic diamine with 4-10 C atoms, dicarboxylic acid with 4-10 C atoms, cycloaliphatic diamine with 6-20 C atoms, and a compound selected from the group consisting of aliphatic lactam with 4-10 C atoms and alpha, omega-amino carboxylic acids with 2-20 C atoms.

The aliphatic diamine with 4-10 C atoms is a propane-1,4-diamine, pentane-1, 5-diamine, hexane-1,6-diamine, heptane-1, 7-diamine, octane-1,8 diamine, nonan-1,9 diamine, decane-1, 10-diamine, for example. The aliphatic diamine with 4-10 C atoms is preferably hexane-1,6-diamine.

The dicarboxylic acid is 4-10 C atoms is preferably butanedioic acid, pentanedioic acid, hexanedioic acid, heptanedioic acid or its derivatives such as its salts or its anhydrides, for example. The dicarboxylic acid with 4-10 C atoms is preferably hexanedioic acid.

The cycloaliphatic diamine with 6-20 C atoms is preferably a cycloaliphatic diamine, whose cycloaliphatic ring/s comprise/s no heteroatoms. The cycloaliphatic diamine with 6-20 C atoms is preferably a cycloaliphatic diamine, which comprises at least one cyclohexane ring. The cycloaliphatic diamine with 6-20 C atoms is particularly preferably a cycloaliphatic diamine which has at least one cyclohexane ring and on which at least one ring and/or on a centrally located methylene group between two rings, at least one ring is substituted by monosubstituted or poly-substituted methyl, ethyl or propyl groups.

The cycloaliphatic diamine with 6-20 C atoms is preferably methylene-bis(4-cyclohexyl amine).

The compound selected from the group consisting of aliphatic lactam with 4-10 C atoms and alpha, omega-amino carboxylic acids is 2-20 C atoms is preferably an aliphatic lactam with 4-10 C atoms.

The aliphatic lactam with 4-10 C atoms is preferably enantholactam, undecanolactam, dodecanolatcam or ε-caprolactam, particularly ε-caprolactam.

The alpha, omega-amino carboxylic acid with 2-20 C atoms is preferably an alpha, omega-amino carboxylic acid with 3-18 C atoms, in particular 6-aminohexanoic acid and 11-aminohexanoic acid. The alpha, omega-amino carboxylic acid with 2-20 C atoms can moreover be its dimers, trimers, tetramers, pentamers or hexamers; as well as its salts, its acid amides or its esters.

The copolymer PA is most preferably a copolymer of 1,6-hexane diamine, adipinic acid, methane-bis-4-(cyclohexylamine) and ε-caprolactam.

A preferred copolymer PA is commercially available under the name of Ultramid® 1C from BASF SE, Germany, for example.

For inhibiting the migration of plasticizers, it is furthermore advantageous, if the copolymer PA comprises a molar ratio of aliphatic diamine with 4-10 C atoms:dicarboxylic acid with 4-10 C atoms:cycloaliphatic diamine with 6-20 C atoms:a compound selected from the group consisting of aliphatic lactam with 4-10 C atoms, and alpha, omega-amino carboxylic acids with 2-20 C atoms from 0.5-2:0.5-4:0.5-2:0.5-2.

The barrier layer S1 consists preferably more than 80% by weight, particularly preferably more than 95% by weight of copolymer PA, relative to the total weight of the barrier layer S1.

The barrier layer S1 preferably comprises a layer thickness in the micrometer range, typically between 100 and 1 μm, preferably between 10 and 2 μm.

The polyamide layer 4 of the barrier layer S1 31 is connected by a polyurethane layer 5 to the sealing layer 2. The polyurethane layer 5 consists more than 10% by weight of polyurethane PUR, relative to the total weight of the polyurethane layer 5, in particular more than 20% by weight, particularly preferably more than 40% by weight.

Names of substances beginning with "poly," such as polyol or polyisocyanate in the present document indicate substances, which formally contain two or more of the functional groups per molecule which occur in their name.

In the present document, the term "polymer" on the one hand comprises a collective of chemically uniform macromolecules that was produced by a polyreaction (polymerization, polyaddition, polycondensation), but which differ however with reference to the degree of polymerization, molar mass and chain length. But on the other hand, this term comprises also derivatives of such collective of macromolecules from polyreactions, that is compounds which were obtained by conversions such as additions or substitutions of functional groups with specified macromolecules, and which can be chemically uniform or chemically non-uniform This term moreover comprises also so-called prepolymers, i.e. reactive oligomeric prepolymers, whose functional groups participate in building-up macromolecules.

The term "polyurethane polymer "includes all polymers which are produced according to the so-called diisocyanate polyaddition method. This even includes such polymers which are almost or completely free of urethane groups. Examples for polyurethane polymers are polyether polyurethanes, polyester polyurethanes, polyether polyureas, polyureas, polyester polyureas, polyisocyanurates and polycarbodiimides.

The polyurethane PUR is preferably a polyester polyurethane or a poly-(meth)-acrylate PAC.

Polyurethanes PUR, which include at least one nucleophilic group, can particularly be produced from at least one polyisocyanate and at least one polyol as well as at least one monomer M1, which comprises at least one isocyanate group or a group which reacts with isocyanate groups and which moreover comprises at least one nucleophilic functional group.

Suitable polyisocyanates that can be used are normal commercial aliphatic, cycloaliphatic or aromatic polyisocyanates, in particular diisocyanates.

Suitable polyols are particularly polyester or polyether polyols, preferably polyester or polyether diols. Further suitable polyols are low-molecular divalent or multivalent alcohols, such as 1,2-ethane diol, 1,3- and 1,4-butane diol, 1,2- and 1,3- propane diol, neopentyl glycol, diethylene glycol, triethylene glycol, the isomeric dipropylene glycols and tripropylene glycols, the isomeric pentane diols, hexane diols, heptane diols, octane diols, nonane diols, decane diols, undecane diols, 1,3- and 1,4-cyclohexane dimethanol, hydrated bisphenol A, dimeric fatty alcohols, 1,1,1-trimethylolethane, 1,1,1-trimethylol propane, glycerin, pentaerythrol, sugar alcohols like xylitol, sorbitol or mannitol, sugar like sucrose, other higher-valent alcohols, as well as mixtures of the above.

Suitable monomers M1 have preferably at least one carboxyl group and/or one sulfonate group. The monomer M1 will preferably be an amino carboxylic acid, in particular a dihydroxy alkyl carboxylic acid, such as dimethylol propionic acid or a similar structured diol carboxylic acid, or a sulfonic acid comprising NCO controlled reactive groups, such as a dihydroxy sulfonic acid, for example. Preferred is the monomer M1, which comprises a sulfonate group, the sodium salt of the N-(2-aminoethyl)-2-aminoethane sulfonic acid.

It has been shown that particularly suitable polyurethanes are those described as "polymer (PII)" in DE 100 00 656 A1 or WO 01/34559 A1, or as "polyurethane" in DE 195 21 500 A1, for example.

Poly (meth) acrylates PAC, which comprise at least one nucleophilic group, can in particular be manufactured from at least one (meth) acrylate monomer and at least one monomer M2, which can be polymerized with the (meth) acrylate monomer and moreover comprises at least one nucleophilic functional group. For example, such poly (met) acrylates are copolymers from at least one (meth) acrylate monomer and at least one unsaturated carboxylic acid, in particular (meth) acrylic acid, maleic acid, fumaric acid, crotonic acid or the like, a (meth) acrylamide or a (meth) acrylic acid ester, comprising a hydroxyl group, in particular hydroxy alkyl (meth) acrylate such as hydroxy butyl acrylate (HBA), hydroxybutyl methacrylate (HBMA), hydroxypropyl acrylate (HPA), hydroxypropyl methacrylate (HPMA), hydroxy ethylacrylate (HEA) or hydroxy ethyl methacrylate (HEMA), or a partial ester of a polyol, preferably glycerin or trimethylolpropane, with (meth) acrylic acid.

This will preferably be polyurethane PUR with a molecular weight of 10,000-500,000 g/mol.

The polyurethane layer 5 preferably has a layer thickness in the micrometer range, typically between 10 in 0.1 µm, preferably between 5 and 0.2 µm, particularly preferably between 4 and 0.5 µm.

Figure 2:
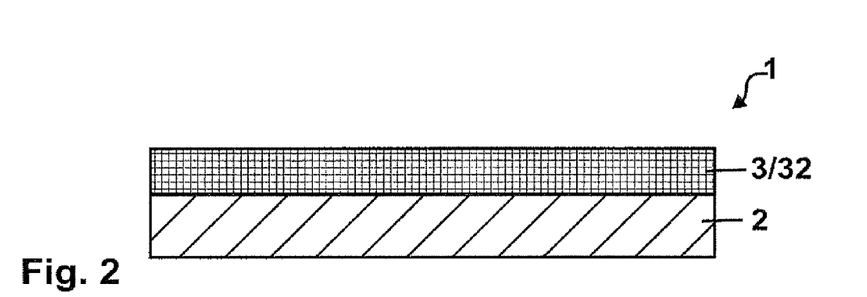
FIG. 2 shows a cross-section through a further possible membrane according to the invention.

FIG. 2 illustrates a cross-section through a potential membrane according to the invention, which has a barrier layer S2 32.

In the case of a barrier layer S2 32, this will be a barrier layer consisting of a composition comprising 5-50% by weight, preferably 5-20% by weight, polyurethane PUR and 50-95% by weight, preferably 80-95% by weight, copolymer PA.

The polyurethane PUR and the copolymer PA are polyurethane PUR and copolymer PA, as they were described previously. The polyurethane PUR and copolymer PA are moreover preferably those that were previously mentioned as preferred polyurethane PUR and copolymer PA.

The barrier layer S2 32 comprises preferably a layer thickness in the micrometer range, typically between 100 and 1 µm, preferably between 10 and 2 µm.

The barrier layer S2 32 consists preferably more than 90% by weight, particularly preferably more than 98% by weight of the sum of copolymer PA together with polyurethane PUR, relative to the total weight of the barrier layer S2.

It is furthermore advantageous, if membrane 1 is a flexible membrane, in particular a flexible sheet. This can be easily rolled up and can therefore be stored or transported easily. It is therefore uncomplicated to bring the membrane to the construction site, where it can be unrolled and be cut to the required dimensions.

A further aspect of the invention is that it also comprises a method for producing a membrane 1 comprising a sealing layer 2, wherein the sealing layer consists more than 50% by weight of PVC, relative to the total weight of the sealing layer. The membrane further includes a barrier layer S1 31, wherein the barrier layer is a polyamide layer 4 consisting more than 50% by weight of copolymer PA, relative to the total weight of the polyamide layer 4, which is connected by a polyurethane layer 5 to the sealing layer 2. The polyurethane layer 5 consists more than 10% by weight of polyurethane PUR, relative to the total weight of the polyurethane layer 5. The method includes the following steps;
  (i) applying a polyurethane dispersion composition PD onto a sealing layer 2;
  (ii) flashing off the polyurethane dispersion composition PD while forming a polyurethane layer 5;
  (iii) forming a polyamide layer 4 on the polyurethane layer 5.

The steps are preferably performed in the chronological sequence of Step (i), followed by Step (ii), followed by Step (iii).

The polyurethane PUR, the copolymer PA, the sealing layer 2, the barrier layer S1 31, the polyamide layer 4 and the polyurethane layer 5 were already described previously. The layers which are suitable and preferred are polyurethane PUR, copolymer PA, sealing layer 2, barrier layer S1 31, polyamide layer 4 and polyurethane layer 5, are those which were previously mentioned as being suitable and preferred polyurethane PUR, copolymer PA, sealing layer 2, barrier layer S1 31, polyamide layer 4 and polyurethane layer 5.

"Flashing off" is to be understood in the entire document as drying a liquid composition following its application, wherein the solvent, respectively the liquid phase, is evaporated either entirely or at least to the extent possible. The flashing off can be performed by evaporation to air with or without flash off means. A blower, in particular an air blower, can serve as flash off means. Preferably, a flash off means will be used. The flash off can be done at room temperature or at an elevated temperature. Flashing off the polyurethane dispersion composition PD in Step (ii) is preferably performed for 1-5 minutes at 100-170° C.

The polyurethane dispersion composition PD is typically a dispersion of polyurethane PUR in a liquid phase, wherein the polyurethane PUR is present as a solid. The liquid phase is preferably water.

The polyurethane dispersion composition PD in Step (ii) preferably comprises a disperse phase consisting of polyurethane PUR as well as a liquid phase, in particular water. It is furthermore advantageous, if the polyurethane PUR of the disperse phase is a non-reactive polyurethane. The percentage of the disperse phase is typically 0.1-90% by weight, relative to the total weight of the polyurethane dispersion composition PD. The percentage of the disperse phase is preferably 30-60% by weight, relative to the total weight of the polyurethane dispersion composition PD.

The polyurethane dispersion composition PD is preferably an aqueous polyurethane dispersion, wherein the polyurethane PUR is present as a solid and the percentage of the polyurethane PUR is preferably 15 to 55% by weight, in particular 25 to 50% by weight, particularly preferably 35 to 45% by weight, relative to the total weight of the polyurethane dispersion composition PD.

The polyamide layer 4 in Step (iii) is preferably formed by applying a composition Z2 in the liquid state, consisting of copolymer PA and a solvent, onto the polyurethane layer 5.

The solvent is typically selected from the group consisting of water, ethanol, methanol, ethanol, 1-propanol, 1-butanol, 2-propanol, 2-butanol, 1,2-ethane diol, 1,2-propanediol, 1,3-propanediol, 1,2-butanediol, 1,3-butanediol, 1,4-butanediol, 2,3-butanediol, 1,5-pentanediol and prop-2-en-1-ol. The solvent will preferably be a 1-propanol/water mixture, preferably the ratio of the weight of 1-propanol:water is from 99:1 to 1:99, particularly preferably from 5:1 to 3:1. It is moreover advantageous, following the application of the composition Z2 in the liquid state, if the applied composition Z2 is heated for 1-5 minutes at 100-170° C. This is an advantage to the effect that this is beneficial for forming a homogenous, continuous barrier layer S1.

It is furthermore advantageous for inhibiting plasticizer migration, if the composition Z2 has a percentage of 1-25% by weight copolymer PA, in particular preferably 15-20% by weight, relative to the total weight of the composition Z2.

The ratio of the weight of copolymer PA to solvent in the composition Z2 is preferably from 1:100 to 1:4, in particular from 1:10 to 1:5.

In a further aspect, the invention also comprises a further method for producing a membrane 1 comprising a sealing layer 2, wherein the sealing layer consists more than 50% by weight of PVC, relative to the total weight of the sealing layer.

The membrane furthermore comprises a barrier layer S2 32, wherein the barrier layer S2 32 consists of a composition comprising 5-50% by weight, preferably 5-20% by weight, polyurethane PUR and 50-95% by weight, preferably 80-95% by weight copolymer PA, including the steps;
  (i') applying a composition Z1 comprising polyurethane PUR, copolymer PA and solvent onto a sealing layer 2;
  (ii') flashing off the composition Z1 while forming a barrier layer S2 32.

The steps are performed preferably in the chronological sequence of Step (i'), followed by Step (ii').

The polyurethane PUR, the copolymer PA, the sealing layer 2, and the barrier layer S2 32 were already described previously. The layers which are suitable and preferred as polyurethane PUR, copolymer PA, sealing layer 2 and barrier layer S1 31 are those which are previously mentioned as being suitable and preferred polyurethane PUR, copolymer PA, sealing layer 2 and barrier layer S2 32.

It is furthermore advantageous, if the application of the Z1 composition in Step (i') is performed by applying the Z1 composition in the liquid state. The viscosity of the Z1 composition at 25° C. is preferably 500-30,000 mPas (measured according to DIN EN ISO 3219/A.3).

It is furthermore advantageous, if the Z1 composition in Step (ii') is flashed off at 100-170° C. for 1-5 minutes.

The solvent of the Z1 composition is typically selected from the group consisting of water, ethanol, methanol, ethanol, 1-propanol, 1-butanol, 2-propanol, 2-butanol, 1,2-ethane diol, 1,2-propanediol, 1,3-propanediol, 1,2-butanediol, 1,3-butanediol, 1,4-butanediol, 2,3-butanediol, 1,5-pentanediol and prop-2-en-1-ol.

The solvent will preferably be a 1-propanol/water mixture, preferably the ratio of the weight of 1-propanol:water is from 99:1 to 1:99, particularly preferably from 5:1 to 3:1.

It is further advantageous, if the percentage of the sum of polyurethane PUR together with copolymer PA totals 1-30% by weight, in particular 15-25% by weight, relative to the total weight of the composition Z1.

The membrane 1 produced according to one of the previously described methods can now be cut to size, cut off, rolled up, or be directly processed further, as required. The rolls with the membrane can now be stored or transported to other locations, as needed.

A further aspect of the present invention relates to the use of the sealing membrane 1 for sealing substrates, which was described in detail previously. The membrane 1 is typically used as prefabricated sheet. In this case, the membrane is preferably produced in a foil facility and is used on the construction site preferably in the form of a membrane from a roll. But the membrane can also be used in the form of strips with a typical width of 1-20 cm, however, to seal connection joints between two roofing membranes. The membrane can furthermore also be available and used in the form of flat objects for the repair of defective positions in seals, for example roofing membranes. A preferred use of the membrane 1 is therefore the use for sealing buildings against moisture in structural and civil engineering, in particular roofs and floors.

A further aspect of the present invention relates to a molding, the surface of which has a membrane 1, wherein the membrane is preferably arranged on the molding with its side facing away from the sealing layer 2. The molding is typically an entity from the structural and civil engineering sector. The term "molding" describes a three-dimensional object.

EXAMPLES

Producing the Za-Ze Compositions

Ultramid® 1C, which is commercially available from the BASF SE Company in Germany, was used as the copolymer PA component of the Za-Ze compositions. Water, [n]-propanol, ethanol, isopropanol, respectively tetrahydrofuran (THF) was used as the solvent component. The two components were mixed together to form the Za-Ze compositions in the quantities and in the weight percentages listed in Table 1.

TABLE 1

| Za-Ze Compositions. | | | | | |
|---|---|---|---|---|---|
|  | Za | Zb | Zc | Zd | Ze |
| Ultramid 1C | 10 | 16 | 20 | 20 | 20.2 |
| Water | 18 | 16.8 | 16 | 16 | 16 |
| n-propanol | 72 | 67.2 | 64 | — | 49 |
| Ethanol | — | — | — | 64 | — |
| Isopropanol | — | — | — | — | 12.3 |
| THF | — | — | — | — | 2.5 |
| Sum of weight percentages | 100 | 100 | 100 | 100 | 100 |

Producing the Polyurethane Dispersion Compositions (PD)

The compositions listed in Table 2 were mixed together at the percentages listed in Table 2 for producing the polyurethane dispersion compositions PD1-PD3. The following materials were used as polyurethane PUR: Incorez® W830/092 and Incorez® W2400 (both INCOREZ LTD, Great Britain) as well as Bayhydrol® UH 2606 (Bayer Material Science, Germany). The film forming additive is a tripropylene glycol n-butyl ether, the liquid phase is water, a siloxane compound was used as wetting agent, and hydrophobic pyrogenic silicic acid was used as thixotropic agent.

TABLE 2

Polyurethane dispersion compositions PD1-PD3.

| PUR | PD1 | PD2 | PD3 |
|---|---|---|---|
| Incorez W830/092 | 94.3*** | — | — |
| Incorez W2400 | — | 71.4** | — |
| Bayhydroll XP 2606 | — | — | 94.3* |
| Film forming additive | 1 | 10 | 0.5 |
| Water | 2.7 | 16.6 | 3.7 |
| Wetting agent | — | 2 | 1.5 |
| Thixotroping agent | 2 | — | — |
| Sum of the weight percentages | 100 | 100 | 100 |

*the 94.3 parts by weight relate to a 35% dispersion of polyurethane PUR in water, the 71.4 parts by weight relate to a 40% dispersion of polyurethane PUR in water, *the 94.3 parts by weight relate to a 35% dispersion of polyurethane PUR in water.

Fabrication of the Sealing Layer

A composition consisting of:

PVC (55% by weight relative to the total weight of the composition), plasticizer, di-iso-nonyl phthalate from Sigma-Aldrich, Switzerland (39% by weight, relative to the total weight of the composition), stabilizer, tin stabilizer dibutyl tin diacetate from Sigma-Aldrich, Switzerland (1% by weight, relative to the total weight of the composition), $CaCO_3$ from Sigma-Aldrich, Switzerland (5% by weight, relative to the total weight of the composition), was formed into a 1.5 mm thick film by extrusion with a sheet-die nozzle.

Description of the Measuring Methods

Test for Plasticizer Migration

Test specimens with dimensions of 120 mm×120 mm were produced from the membranes and weighed (weight d0). These test specimens were thereafter placed onto a body with the dimensions of 120 mm×120 mm and a thickness of approximately 40-50 mm of EPS (expanded polystyrene rigid foam). Furthermore, a glass plate with the dimensions of 100 mm×100 mm and a 2 kg weight on top was arranged on the test specimen. This configuration was stored for 28 days at 70° C., 50±5% relative air humidity). The test specimens were subsequently weighed again (weight d28) and the difference in weight from the weight d0 was determined.

Test for Aging

Test specimens with the dimensions of 20 cm×10 cm were produced from the membranes. The test specimens were stored for 28 days in an air-circulating oven at a temperature of 70±2° C. Thereafter, the test specimens were bent 20 times in the center and were folded together, and subsequently the detachment of the barrier layer from the membrane was evaluated visually.

Fabrication and Aging Tests with Comparative Membrane

Figure 3:
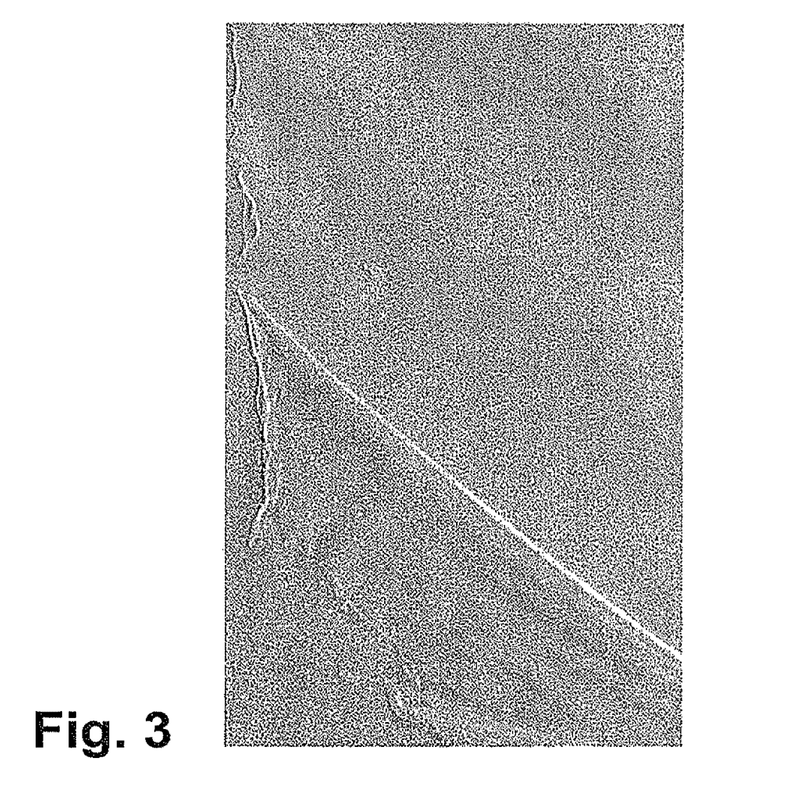
FIG. 3 illustrates a delamination of a polyamide layer from a PVC layer, following anti-aging treatment.

To form a polyamide layer, using a knife coater (K-CONTROL-COATER-System K 202, ERICHSEN, Germany), the respective Za-Ze composition with a thickness of 24 µm were applied onto a sealing layer measuring 20 cm×30 cm×1.5 mm at a temperature of 30° C., the fabrication of which was described previously, and were heated in an oven for two minutes at a temperature of 160° C. The comparative membranes manufactured in this manner were subjected to the aging test described previously. All comparative membranes exhibited a heavy delamination of the polyamide layer. An example of such delamination of the polyamide layer from the sealing layer is illustrated in FIG. 3.

Fabrication and Aging Tests with a Membrane According to the Invention Comprising a Sealing Layer S1

Using a knife coater (K-CONTROL-COATER-System K 202, ERICHSEN, Germany), the respective PD1-PD3 polyurethane dispersions were applied with a 4 µm layer thickness onto a sealing layer of 20 cm×30 cm×1.5 mm, the fabrication of which was described previously. The films were heated in an oven for 2 minutes at a temperature of 160° C. Immediately thereafter, the respective Za-Ze composition was applied onto the sealing layer by means of the previously mentioned knife coater in order to form a polyamide layer with a layer thickness of 24 µm at a temperature of 30° C., and heated in an oven for 2 minutes at a temperature of 160° C.

Figure 4:
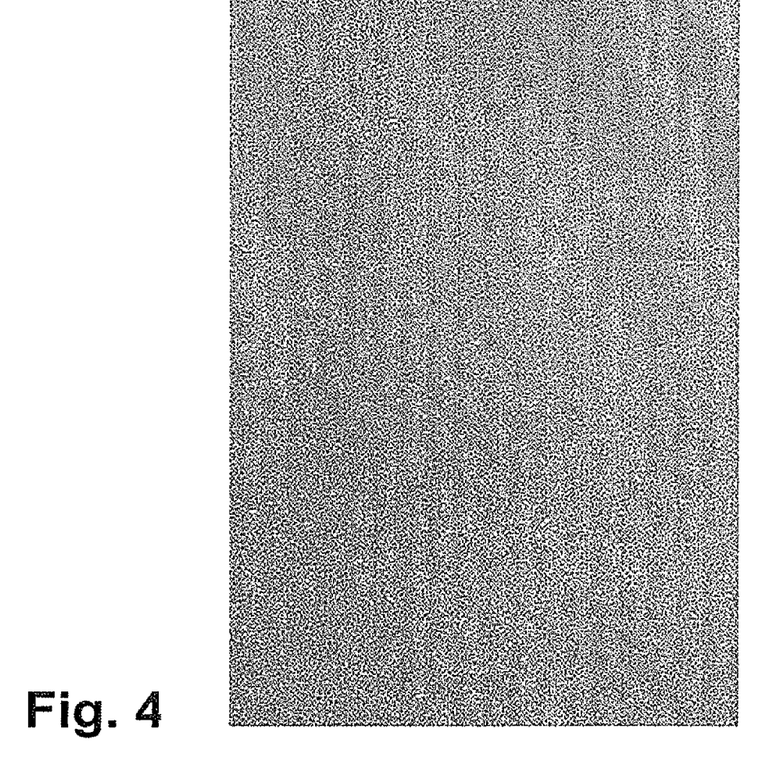
FIG. 4 shows a polyamide layer on top of the PVC layer that shows no delamination following anti-aging treatment.

Subsequently, the membranes according to the invention manufactured in this manner (all combinations of the individual PD1-PD3 polyurethane dispersions with the individual Za-Ze composition) were subjected to the previously described aging test. None of the membranes according to the invention showed a delamination of the polyamide layer, as can be seen in FIG. 4.

Fabrication and Aging Tests with a Membrane According to the Invention Comprising a Sealing Layer S2

80 parts by weight of the previously described Zc composition were mixed with 20 parts by weight of the previously described PD2 polyurethane dispersion and were applied by means of a knife coater (K-CONTROL-COATER-System K 202, ERICHSEN, Germany) with a coating thickness of 24 µm (coating thickness immediately after the application) onto a sealing layer measuring 20 cm×30 cm×1.5 mm, the fabrication of which was described previously. The films were heated in an oven for 2 minutes at a temperature of 160° C. (the layer thickness after heating was 4-6 µm).

Subsequently, the membrane manufactured in this way was subjected to the aging test previously described. The membrane exhibited no delamination from the sealing layer S2.

Plasticizer Migration Test

An untreated sealing layer, a first comparative membrane with a sealing layer S1 with a polyurethane layer of the PD3 polyurethane dispersion, a second comparative membrane the polyamide layer of the Zc composition, a membrane according to the invention with a barrier layer S1 with a polyurethane layer of the PD3 polyurethane dispersion and with a polyamide layer of the Zc composition, as well as the previously described membrane according to the invention with a sealing layer S2, were subjected to the previously described plasticizer migration test.

The untreated sealing layer exhibited a weight loss of 3.48% by weight, the first comparative membrane exhibited a weight loss of 3.19% by weight, the second comparative membrane exhibited a weight loss of 0.15% by weight, the membrane according to the invention with a sealing layer S1 exhibited a weight loss of 0.14% by weight and the membrane according to the invention with a sealing layer S2 exhibited a weight loss of 0.84% by weight.

LIST OF REFERENCE SYMBOLS

1 Membrane
2 Sealing layer
3 Barrier layer
31 Barrier layer S1
32 Barrier layer S2
4 Polyamide layer
5 Polyurethane layer

The invention claimed is:

1. A method for producing a membrane, the membrane comprising a sealing layer that comprises PVC by more than 50% by weight, relative to the total weight of the sealing layer, and a barrier layer S1, wherein the barrier layer is a polyamide layer comprising more than 50% by weight of copolymer PA, relative to the total weight of the polyamide layer which is connected with the sealing layer by a polyurethane layer wherein the polyurethane layer comprises more than 10% by weight of polyurethane PUR, relative to the total weight of the polyurethane layer, the method comprising:

(i) applying a polyurethane dispersion composition PD onto a sealing layer, (ii) flashing off the polyurethane dispersion composition PD while forming a polyurethane layer; and (iii) forming a polyamide layer on the polyurethane layer, wherein the copolymer PUR has at least one nucleophilic functional, which is selected from the group consisting of hydroxyl group, carboxyl group, sulfonate group and phosphate group, and wherein the copolymer PA is a copolymer of aliphatic diamine with 4-10 C atoms, dicarboxylic acid with 4-10 C atoms, cycloaliphatic diamine with 6-20 C atoms, and a compound selected from the group consisting of aliphatic lactam with 4-10 C atoms and alpha, omega-amino carboxylic acids with 2-20 C atoms.

2. The method according to claim 1, wherein the formation of the polyamide layer in Step (iii) is performed by applying a composition Z2 in the liquid state, comprising the copolymer PA and a solvent, onto the polyurethane layer.

3. The method according to claim 2, wherein after the application of the composition Z2 in the liquid state, the applied composition Z2 is heated for 1-5 minutes at 100-170° C.

4. The method according to claim 2, wherein the composition Z2 comprises a proportion of 1-25% by weight of the copolymer PA, relative to the total weight of the composition Z2.

5. The method according to claim 1, wherein the polyurethane dispersion composition PD in Step (ii) comprises a disperse phase comprising the polyurethane PUR as well as a liquid phase.

6. The method according to claim 5, wherein the polyurethane PUR of the disperse phase is a non-reactive polyurethane.

7. The method according to claim 5, wherein the liquid phase includes water.

* * * * *